United States Patent
Fang et al.

(10) Patent No.: US 9,910,580 B2
(45) Date of Patent: Mar. 6, 2018

(54) LIST DISPLAY CONTROL METHOD AND DEVICE

(71) Applicant: International Business Machines Corporation, Armonk, NY (US)

(72) Inventors: Yu Fang, Beijing (CN); Shuo Li, Beijing (CN); Guan Jun Liu, Beijing (CN); Jiang Bin Ning, Beijing (CN); Xin Ying Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 14/697,714

(22) Filed: Apr. 28, 2015

(65) Prior Publication Data
US 2016/0034125 A1 Feb. 4, 2016

(30) Foreign Application Priority Data
Jul. 31, 2014 (CN) .......................... 2014 1 0373606

(51) Int. Cl.
*G06F 3/048* (2013.01)
*G06F 3/0485* (2013.01)
*G06F 3/0482* (2013.01)

(52) U.S. Cl.
CPC .......... *G06F 3/0485* (2013.01); *G06F 3/0482* (2013.01)

(58) Field of Classification Search
CPC ... G06F 3/0485; G06F 3/0482; G06F 3/04812
See application file for complete search history.

(56) References Cited

U.S. PATENT DOCUMENTS

| 6,011,555 A | 1/2000 | Eckhoff et al. |
| 7,346,851 B2 | 3/2008 | Munoz-Bustamante |
| 7,565,622 B2 | 7/2009 | Chen et al. |
| 2002/0167548 A1 | 11/2002 | Murray |
| 2003/0007010 A1 | 1/2003 | Ullmann et al. |
| 2004/0021694 A1* | 2/2004 | Doar .................. G06F 3/04855 715/784 |
| 2006/0038796 A1* | 2/2006 | Hinckley ............ G06F 3/03547 345/173 |
| 2009/0007009 A1 | 1/2009 | Luneau et al. |

OTHER PUBLICATIONS https://web.archive.org/web/20130312105720/https://stackoverflow.com/questions/11548072/building-scrollable-div-without-scrollbar.*
http://jsfiddle.net/qcv5Q/1/.*

(Continued)

*Primary Examiner* — Peiyong Weng
(74) *Attorney, Agent, or Firm* — Robert C. Bunker

(57) ABSTRACT

List display control method and device are provided. The method may include displaying a plurality of list items in a list display area. The method may also include performing at least one of the following based on an operation of a pointer in the list display area: scrolling up, in response to a first operation of the pointer on any list item of the plurality of list items in a first area of the list display area and scrolling down, in response to a second operation of the pointer on any list item of the plurality of list items in a second area of the list display area which is different from the first area.

20 Claims, 8 Drawing Sheets

(56) References Cited

OTHER PUBLICATIONS

Coyier, "Solution for Very Long Dropdown Menus," CSS-Tricks, Oct. 21, 2009, pp. 1-32, https://css-tricks.com/long-dropdowns-solution/, Accessed on Apr. 20, 2015.

Fang et al., "List Display Control Method and Device," English Translation Application and Drawings, Filed on Jul. 31, 2014, p. 1-34, China Patent Application Serial No. 201410373606.X.

Xiong, "The design of automatically generating drop-down menu on JSP," 2012 International Conference on Computer Science and Information Processing (CSIP), 2012, p. 1404-1406, IEEE.

* cited by examiner

ns, the above and other objects, features and advantages of the present disclosure will become more apparent, wherein the same reference generally refers to the same components in the embodiments of the present disclosure.

LIST DISPLAY CONTROL METHOD AND DEVICE

BACKGROUND

The present invention relates to graphic user interface, and more specifically, to a list display control method and device.

As functions of software become increasingly powerful, there are more and more options in the menu of the software, resulting in a list of the options getting longer and longer. An overlong list covers some other display areas in the display screen on one hand and increases the inconvenience of looking for a desired option on the other hand.

SUMMARY

In view of the problems as described above, the present invention is proposed. The object of the present invention is to provide a list display control method and device which make the operation of list display easy so as to enhance the operability of list display and is capable of realizing precise scrolling of the list so that the user can carefully read every list item to avoid any missing.

According to an aspect of the present invention, there is provided a list display control method, comprising: displaying a plurality of list items in a list display area; and performing at least one of the following based on an operation of a pointer in the list display area: scrolling up, in response to a first operation of the pointer on any list item of the plurality of list items in a first area of the list display area, the list until any list item is displayed as a first predetermined item in the list display area; and scrolling down, in response to a second operation of the pointer on any list item of the plurality of list items in a second area of the list display area which is different from the first area, the list until any list item is displayed as a second predetermined item in the list display area.

According to another aspect of the present invention, there is provided A list display control device, comprising: a display module, configured to display a plurality of list items in a list display area; and a scrolling module, configured to perform at least one of the following based on operation of a pointer in the list display area: scrolling up, in response to a first operation of the pointer on any list item of the plurality of list items in a first area of the list display area, the list until any list item is displayed as a first predetermined item in the list display area; and scrolling down, in response to a second operation of the pointer on any list item of the plurality of list items in a second area of the list display area which is different from the first area, the list until any list item is displayed as a second predetermined item in the list display area.

According to the method and device of the above described aspects of the present invention, mouse device needs not to be moved drastically to scroll the list items up or down, whereby making the operations easy and enhancing the operability of displaying the list. In addition, a certain list item may scroll to a predetermined position by performing operations on this list item, such that a precise scrolling of the list is achieved, and therefore the user can carefully read every list item to avoid missing any item.

BRIEF DESCRIPTION OF THE SEVERAL VIEWS OF THE DRAWINGS

Through the more detailed description of some embodiments of the present disclosure in the accompanying draw

FIG. 6(a)-(d) shows one exemplary situation of the list display according to an embodiment of the present invention.

Figures 7A, 7B, 7C, 7D, 7E, 7F:
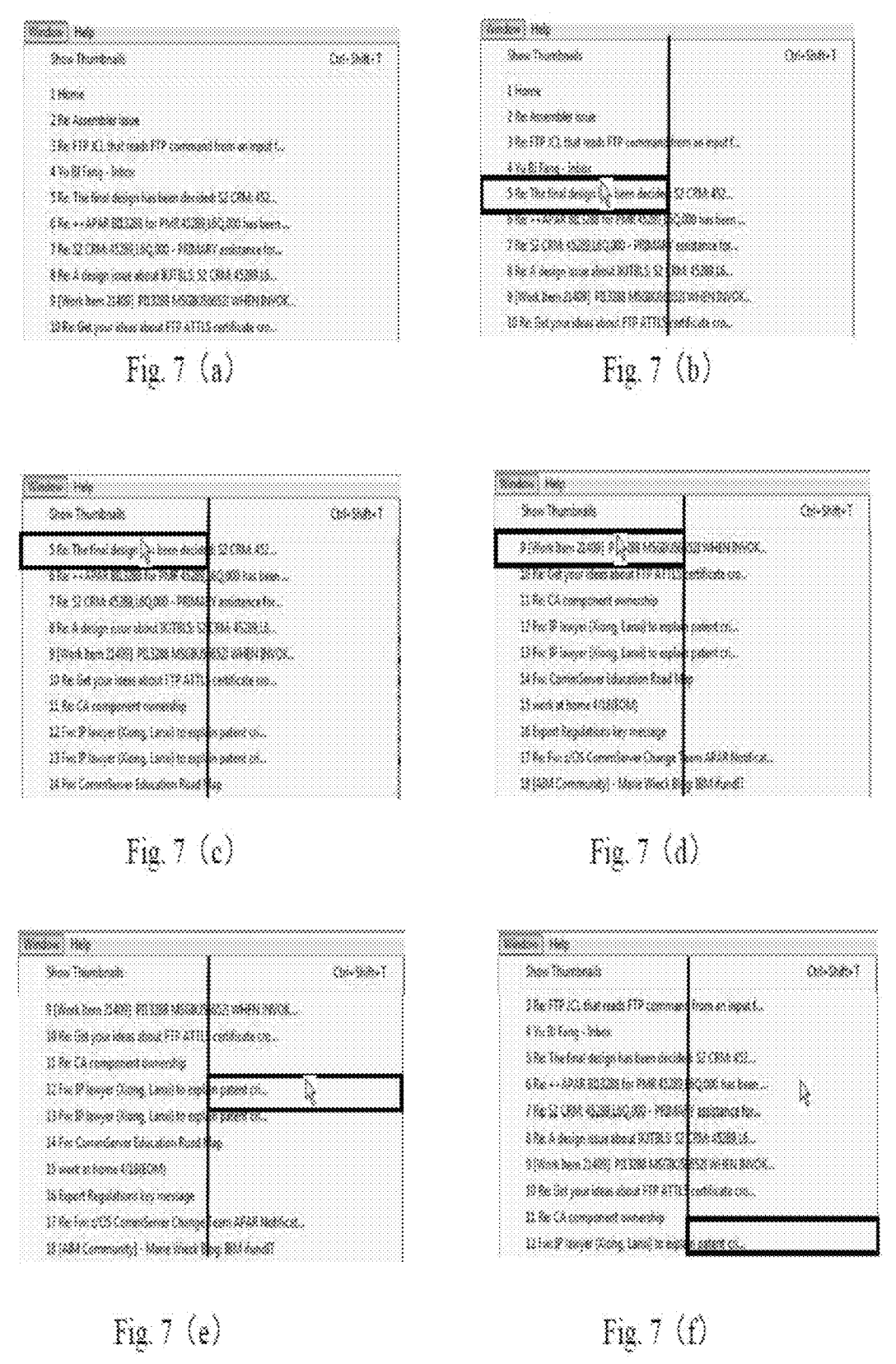

FIG. 7(a)-(f) shows another exemplary situation of the list display according to an embodiment of the present invention.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure.

Figure 2:
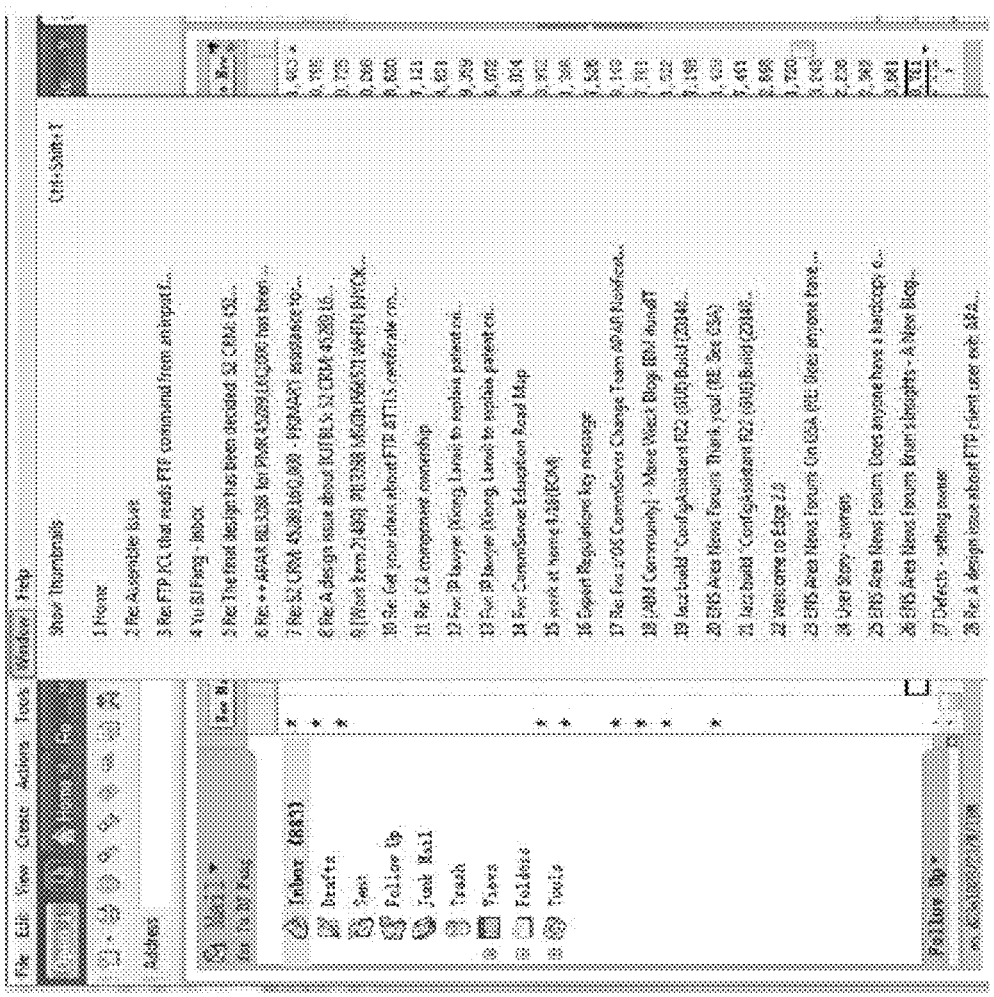
FIG. 2 shows an exemplary situation where a list covers some display area of the display screen.

As previously described, as functions of software become increasingly powerful, there are more and more options in the menu of the software, resulting in a list of the options getting longer and longer. An overlong list covers some other display areas in the display screen (as shown in FIG. 2) on one hand and increases the inconvenience of looking for a desired option on the other hand.

Figure 3:
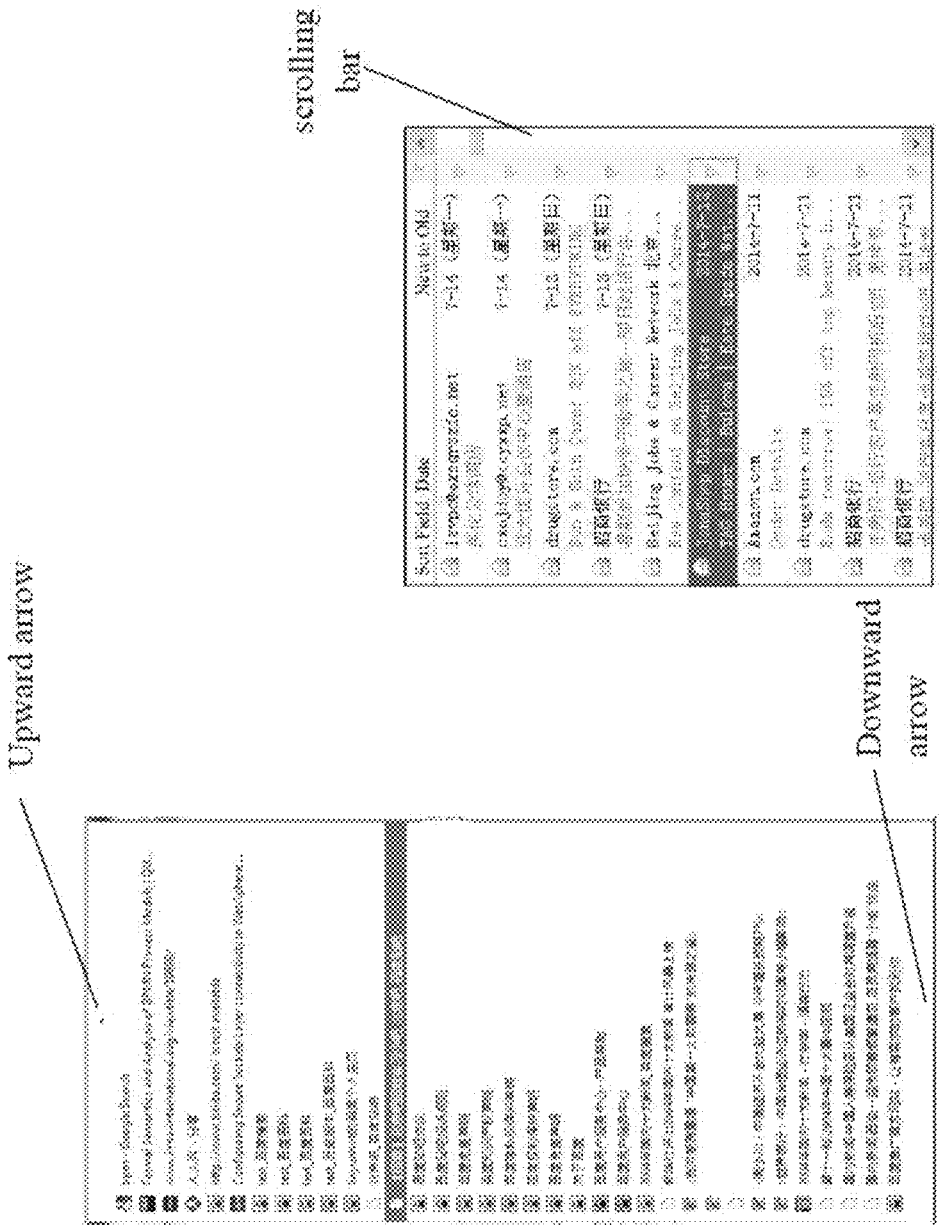
FIG. 3(a) shows an example of a list display with upward and downward arrows.
FIG. 3(b) shows an example of a list display with a scrolling bar.

There are two main solutions for the situation as described above. One of them is placing an upward arrow and a downward arrow on the top and the bottom of the list display area with certain size, as shown in FIG. 3(a), and the list items in the list can be viewed by clicking the upward and downward arrows so as to scroll the optional list items. The other one is setting a scrolling bar for the list display area as shown in FIG. 3(b), so that the optional list items can be scrolled by scrolling the scrolling bar. For the first solution, if there are many optional list items in the list display area, the upward arrow is far away from the downward arrow. Consequently, if a user desires to scroll down the optional list items after clicking the upward arrow to scroll up the optional list items, the mouse device will be moved drastically so as to find the downward arrow, which is very inconvenient. Furthermore, when there are many optional list items and some of them are similar to each other, it is difficult to find the desired list item conveniently with naked eyes. For the second solution, it is hard to estimate the length to be scrolled, and also, when there are many optional list items and some of them are similar to each other, it is difficult to find the desired list item conveniently with naked eyes. In addition, as a rule of thumb, another disadvantage of using the scrolling bar is that the focus often moves out of the list display area during the sliding of the scrolling bar.

Figure 1:
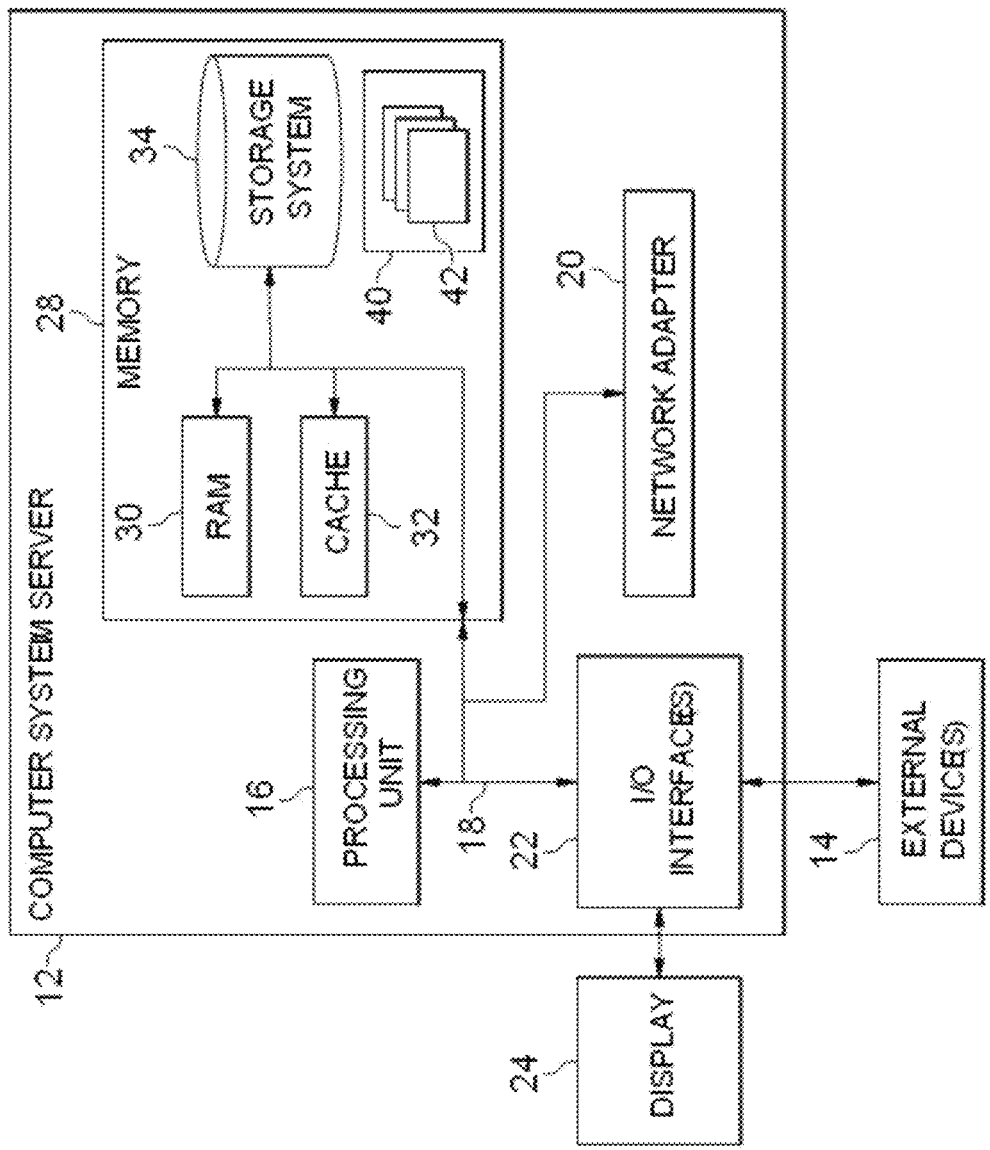
- FIG. 1 shows a block diagram of an exemplary computer system/server which is applicable to implement the embodiments of the present invention.

Referring now to FIG. 1, in which an exemplary computer system/server 12 which is applicable to implement the embodiments of the present invention is shown. Computer system/server 12 shown in FIG. 1 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
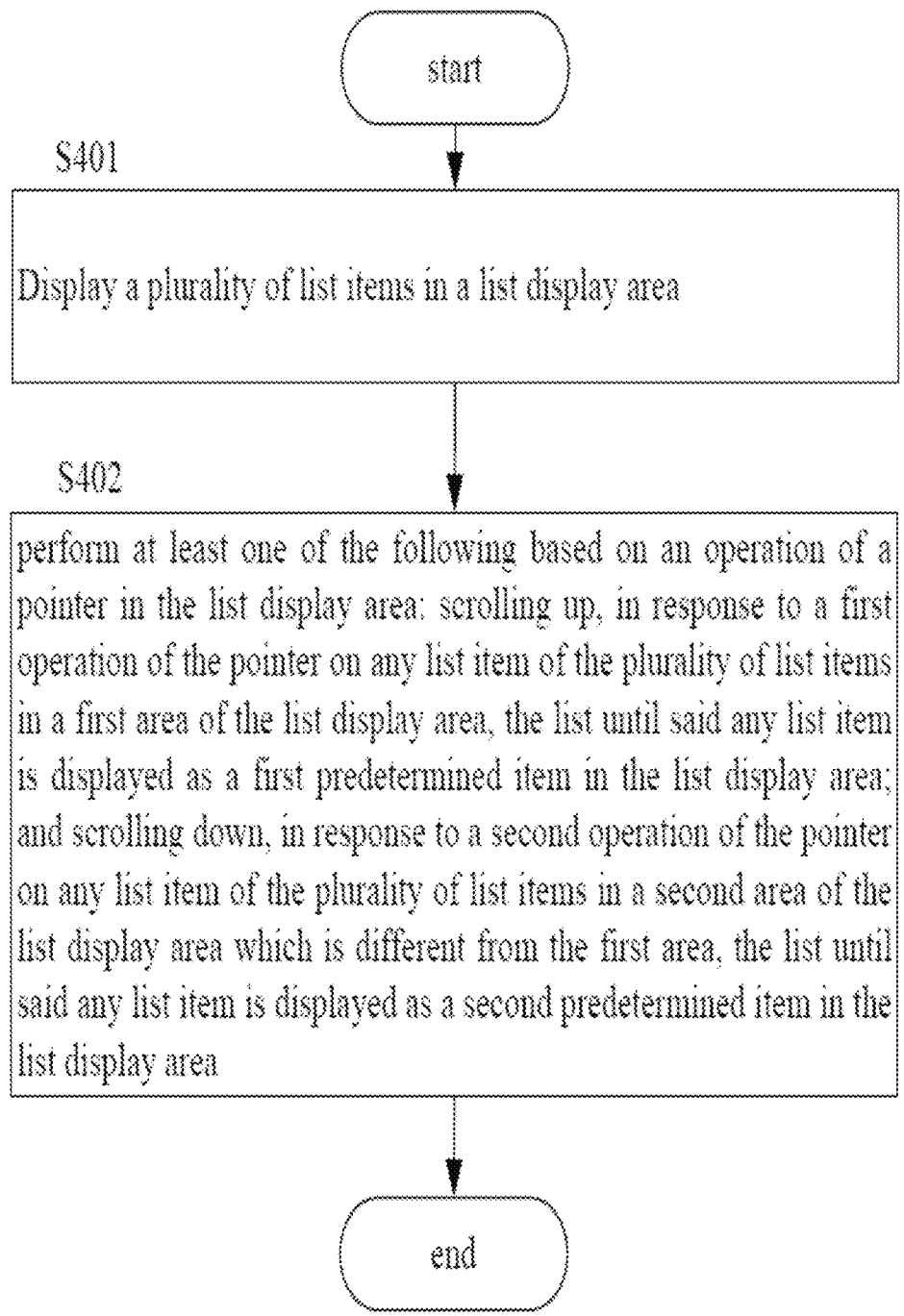
FIG. 4 shows a flow chart of a list display control method according to an embodiment of the present invention.

With reference now to FIG. 4, a flow chart of the list display control method according to an embodiment of the present invention is shown.

As shown in FIG. 4, at step S401, a plurality of list items are displayed in a list display area.

The list display area is an area used for displaying various list items in the list, and the size thereof can be set based on, for example, the size of the display screen. For example, if the height of the display screen is 1, then the height of the list display area may be 0.5, 0.618, 0.75 or the like, depending on specific situations. In this step, the plurality of list items in the list are displayed in a set list display area.

At step S402, at least one of the following is performed based on an operation of a pointer in the list display area: scrolling up, in response to a first operation of the pointer on any list item of the plurality of list items in a first area of the list display area, the list until said any list item is displayed as a first predetermined item in the list display area; and scrolling down, in response to a second operation of the pointer on any list item of the plurality of list items in a second area of the list display area which is different from the first area, the list until said any list item is displayed as a second predetermined item in the list display area.

Firstly, the process performed in response to the first operation of the pointer on any item of the plurality of list items in the first area of the list display area will be described.

Figure 5:
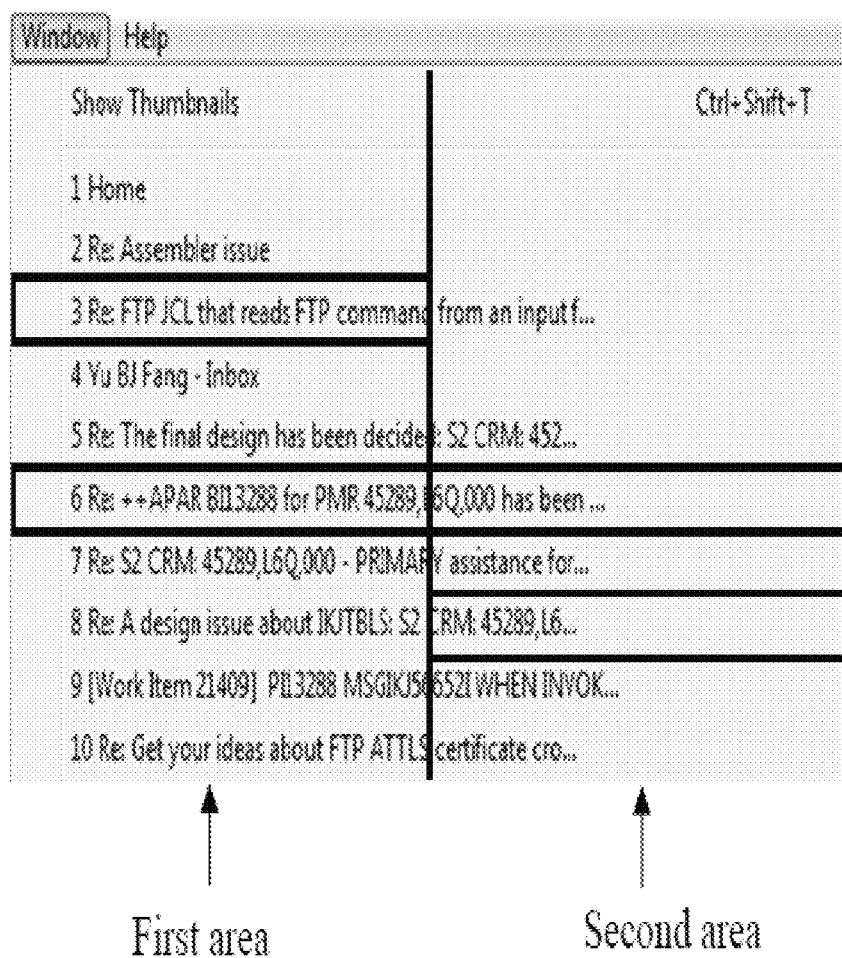
FIG. 5 shows an exemplary display in the list display area according to an embodiment of the present invention.

The first area may be set depending on specific situations. For example, optionally, the first area may be a left/right half area, a left/right one third area, a left/right quarter area of the list display area or the like. In this embodiment, for the sake of easy explanation, the description is given in an example that the first area is the left half area of the list display area, as shown in FIG. 5.

The pointer is a pointing device such as a mouse device, a finger of the user or the like. For the sake of easy explanation, the description will be given below in an example that the pointer is the mouse device.

The first operation can be various appropriate operations which are set in advance. For example, the first operation may be one or more click operations of the pointer, one or more slide operations of the pointer in any direction, an operation of placing a mouse indicator controlled by the mouse device on a certain list item when the pointer is the mouse device or an operation of placing a user's finger on a certain list item when the pointer is the finger. It is to be noted that although, in the conventional list operations, the click operation of the pointer usually corresponds to a default specific behavior (e.g., clicking a left key of the mouse device or clicking with the finger generally corresponds to opening the item which was clicked), it can be understood that the specific behaviors to which various pointer operations including the click operation of the pointer correspond can be redefined by programming list display widget, for example. In this step, when the mouse device performs a first operation in the first area of the list display area on any list item of the plurality of list items displayed in the list display area, the list is scrolled upward until said list item is displayed as a first predetermined item in the list display area. According to this scrolling manner, the list item on which the first operation is performed by the mouse device is always scrolled to be positioned at a predetermined item in the list display area, thereby implementing a precise scrolling of the list.

The first predetermined item may be any appropriate list item set in advance. For example, as an option, the first predetermined item can be the first item in the list display area. In this case, for the exemplary situation as shown in FIG. 5, when the mouse device performs the first operation in the left half area of the list display area on the sixth list item, the list is scrolled upward until the sixth list item is positioned at the first item in the list display area.

It can be understood that it is only a specific example of using the first item in the list display area as the first predetermined item, and actually, as a more general manner, the first predetermined item may be set as following: setting any item in the list display area as a basic item, and if the list item on which the first operation is performed by the mouse device stays after or on the basic item, the basic item is used as the first predetermined item; if the list item on which the first operation is performed by the mouse device stays before the basic item, anyone among said list item and the items before said list item is used as the first predetermined item. Still taking the situation as shown in FIG. 5 as an example, it is assumed that the basic item is the fourth item in the list display area. If the mouse device performs the first operation in the left half area of the list display area on the sixth list item, since the sixth item stays after the fourth item, the fourth item is the first predetermined item here, and the list is scrolled upward until the sixth list item is positioned on the fourth item in the list display area. If the mouse device performs the first operation in the left half area of the list display area on the third list item, since the third item stays before the fourth item, anyone among the third list item and the list items before the third list item is used as the first predetermined item. It is assumed herein the first list item to be the first predetermined item, and thus the list is scrolled upward until the third list item is positioned on the first item in the list display area.

In addition, as an option, the first predetermined item may also be set as following: setting the list item n items before the one on which the first operation is performed by the mouse device as the basic item, and if the number m of the list items in the list display area staying before the one on which the first operation is performed by the mouse device is larger than n, the basic item is used as the first predetermined item, otherwise anyone among the item on which the first operation is performed by the mouse device and those before this item is used as the first predetermined item. Still taking the situation as shown in FIG. 5 as an example, it is assumed that the basic item is the one 3 items before the list item on which the first operation is performed by the mouse device. If the mouse device performs the first operation in the left half area of the list display area on the sixth list item, since the number of the list items in the list display area staying before the sixth list item is 5, which is larger than 3, the list item 3 items before the sixth list item (i.e, the third item) is used as the first predetermined item here, and the list is scrolled upward until the sixth list item is positioned at the third item in the list display area. If the mouse device performs the first operation in the left half area of the list display area on the third list item, since the number of the list items in the list display area staying before the third list item is 2, which is smaller than 3, anyone among the third list item and those staying before this item is used as the first predetermined item. It is assumed herein the first list item to be the first predetermined item, and thus the list is scrolled upward until the third list item is positioned on the first item in the list display area.

On the other hand, as an optional manner, the list can also be scrolled in the following manner when scrolling upward. For the sake of easy explanation, the description is given here by taking an example that the first predetermined item is the first item in the list display area. In specific, in the case where the list items displayed in the list display area reach the maximum number of list items which can be displayed in the list display area, if the number of the list items in the list staying after the list item on which the first operation is performed by the mouse device is not less than the number of the items which can be displayed at most in the list display area minus one, the list is scrolled upward until said list item is positioned on the first item in the list display area. Otherwise, the list is scrolled upward until the last item in the list is displayed as the last item in the list display area. This will be explained below with reference to FIGS. 6(a)-(d) by way of example. FIGS. 6(a)-(d) illustrate an exemplary situation of the list display according to an embodiment of the present invention.

Figures 6A, 6B, 6C, 6D:
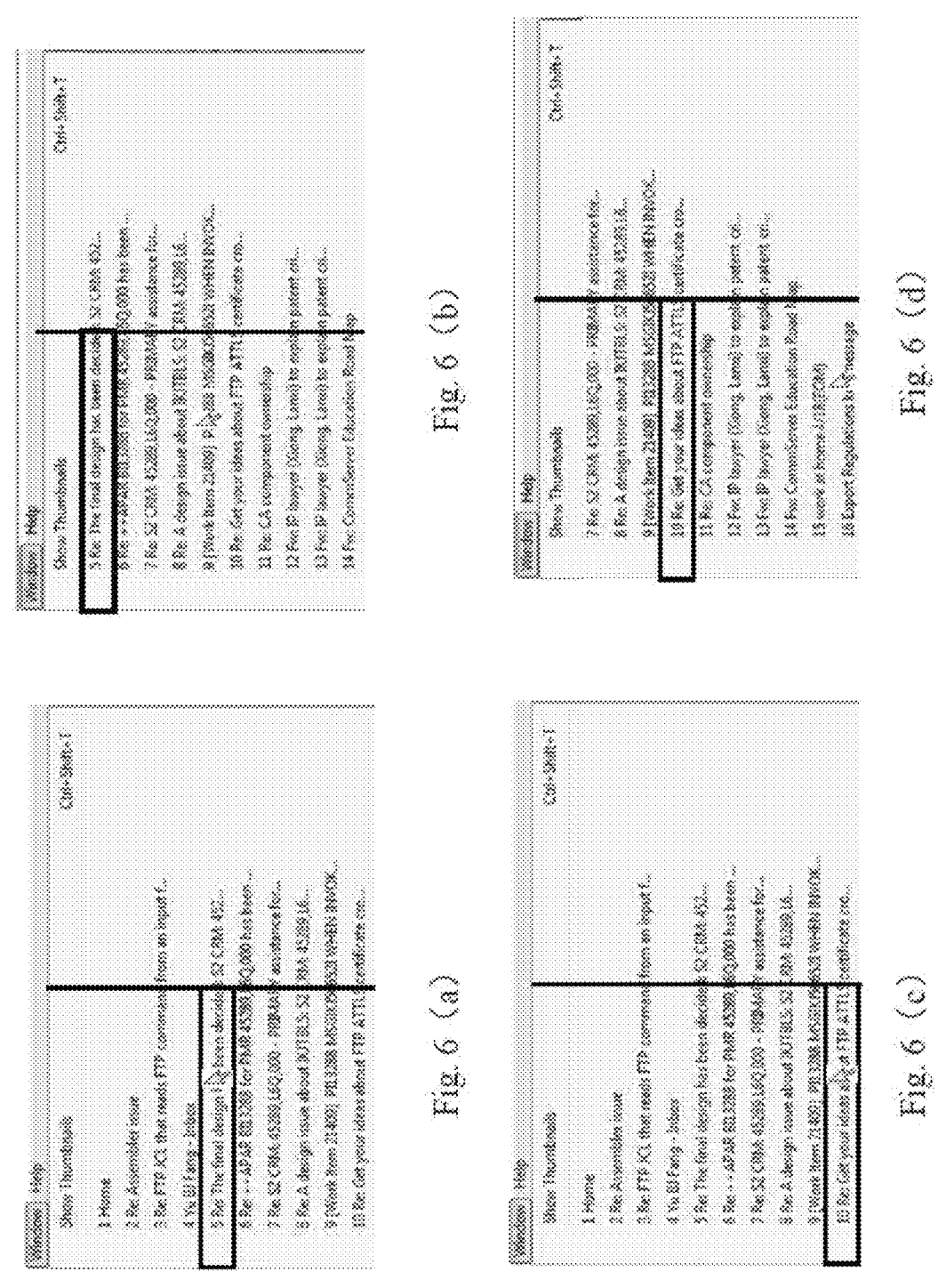

It is assumed the list display area can display 10 list items at most, there are 16 list items in the list, and the first predetermined item is the first item in the list display area. When the number of list items displayed in the list display area reaches 10, the number of the list items which can be displayed in the list display area at most (that is, the list display area is full), as shown in FIG. 6(a), and the mouse device performs the first operation in the left half area of the list display area on the fifth list item, since the number of list items in the list staying after the fifth list item is 11 which is not less than the number of the items which can be displayed at most in the list display area minus one (i.e., 9), the list is scrolled upward until the fifth list item is positioned at the first item in the list display area, as shown in FIG. 6(b). While when the mouse device performs the first operation in the left half area of the list display area on the tenth list item, as shown in FIG. 6(c), since the number of the list items in the list staying after the tenth list item is 6, which is less than the number of the items that can be displayed at most in the list display area minus one (i.e., 9), the list is scrolled upward until the last list item in the list (that is, the sixteenth item) is positioned at the last item in the list display area, as shown in FIG. 6(d). It can be understood that this display manner ensures the number of the list items displayed in the list display area always being 10, i.e., ensures the list display area always being full.

On the other hand, as an option, in this step, when the first operation is that the mouse indicator controlled by the mouse device is placed on a certain list item, the list may not be scrolled up until the mouse indicator keeps staying on this list item for a predetermined time period, in the case that the mouse indicator enters the list display area for the first time or enters the list display area again after leaving it. For example, in the case that the mouse indicator enters the list display area for the first time or enters the list display area again after leaving it, when the mouse indicator is placed on any list item of the plurality of list items in the first area of the list display area, the list item may flash, vibrate, change colors or the like for the predetermined time period, to prompt the user that the list is about to scroll. If the mouse indicator keeps staying on this list item during the flashing, vibrating, changing colors or the like, the list will be scrolled upward; and if the user realizes he/she does not want to scroll up the list during the flashing, vibrating, changing colors or the like, he/she may, for example, move the mouse indicator out of the list display area such that the list will not be scrolled upward. In this manner, when the mouse indicator enters the list display area for the first time or enters the list display area again after leaving it, there is sufficient time for the user to view clearly whether there is an option of interest in the list to avoid any missing.

Hereinafter, the process performed in response to the second operation of the pointer on any item of the plurality of list items in the second area of the list display area will be described.

The specific operations in this case are substantially similar to those in the case that the pointer performs the first operation on any item of the plurality of list items in the first area of the list display area, and for the sake of concision, the detailed description is given for only the difference there between.

Similar to the first area, the second area may also be set depending on specification situations. In specific, the second area is not overlapped with the first area, and optionally may be an area in the list display area which is symmetrical with the first area. For example, if the first area is the left/right half area, the left/right one third area, the left/right quarter area of the list display area or the like as described above, the second area may be the right/left half area, the right/left one third area, the right/left quarter area of the list display area or the like. In this embodiment, for the sake of easy explanation, the description is given in an example that the second area is the right half area of the list display area, as shown in FIG. 5.

In addition, similar to the first operation, the second operation can also be various appropriate operations which are set in advance. For example, the second operation may be one or more click operations of the pointer, one or more slide operations of the pointer in any direction, an operation of placing a mouse indicator controlled by the mouse device on a certain list item when the pointer is the mouse device or an operation of placing a user's finger on a certain list item when the pointer is the finger. It can be understood that the second operation can be the same as or different from the first operation. Hereinafter, the explanation will be given by taking the example that the second operation is the same as the first operation.

In this step, when the mouse device performs a second operation in the second area of the list display area on any item of the plurality of list items displayed in the list display area, the list is scrolled downward until said list item is displayed as a second predetermined item in the list display area. According to this scrolling manner, the list item on which the second operation is performed by the mouse device is always scrolled to be positioned at a predetermined item in the list display area, thereby implementing a precise scrolling of the list.

Similar to the first predetermined item, the second predetermined item may be any appropriate list item set in advance. For example, as an option, the second predetermined item can be the last item in the list display area. In this case, for the exemplary situation as shown in FIG. 5, when the mouse device performs the second operation in the right half area of the list display area on the sixth list item, the list is scrolled downward until the sixth list item is positioned at the last item in the list display area.

It can be understood that that it is only a specific example of using the last item in the list display area as the second predetermined item, and actually, as a more general manner, the second predetermined item may be set as following: setting any item in the list display area as a basic item, and if the list item on which the second operation is performed by the mouse device stays before or on the basic item, the basic item is used as the second predetermined item; if the list item on which the second operation is performed by the mouse device stays after the basic item, anyone among said list item and the items staying after said list item is used as the second predetermined item. Still taking the situation as shown in FIG. 5 as an example, it is assumed that the basic item is the seventh item in the list display area. If the mouse device performs the second operation in the right half area of the list display area on the sixth list item, since the sixth item stays before the seventh item, the seventh item is the second predetermined item here, and the list is scrolled downward until the sixth list item is positioned on the seventh item in the list display area. If the mouse device performs the second operation in the right half area of the list display area on the eighth list item, since the eighth item stays after the seventh item, anyone among the eighth list item and the list items after the eighth list item is used as the second predetermined item. It is assumed herein the tenth list item (i.e., the last item) to be the second predetermined item, and thus the list is scrolled downward until the eighth list item is positioned on the tenth item in the list display area.

In addition, as an option, the second predetermined item can also be set as following: setting the list item n items after the one on which the second operation is performed by the mouse device as the basic item, and if the number m of the list items in the list display area staying after the one on which the second operation is performed by the mouse device is larger than n, the basic item is used as the second predetermined item, otherwise anyone among the item on which the second operation is performed by the mouse device and those after this item is used as the second predetermined item. Still taking the situation as shown in FIG. 5 as an example, it is assumed that the basic item is the one 3 items after the list item on which the second operation is performed by the mouse device. If the mouse device performs the second operation in the right half area of the list display area on the sixth list item, since the number of the list items in the list display area staying after the sixth list item is 4, which is larger than 3, the list item 3 items after the sixth list item (i.e., the ninth item) is used as the second predetermined item here, and the list is scrolled downward until the sixth list item is positioned at the ninth item in the list display area. If the mouse device performs the second operation in the right half area of the list display area on the eighth list item, since the number of the list items in the list display area staying after the eighth list item is 2, which is smaller than 3, anyone among the eighth list item and those staying after this item is used as the second predetermined item. It is assumed herein the tenth list item to be the second predetermined item, and thus the list is scrolled downward until the eighth list item is positioned on the tenth item in the list display area.

On the other hand, as an optional manner, the list can also be scrolled in the following manner when scrolling downward. For the sake of easy explanation, the description is given here by taking an example that the second predetermined item is the last item in the list display area. In specific, if the number of the list items staying before the list item on which the second operation is performed by the mouse device is not less than the number of the items which can be displayed at most in the list display area minus one, the list is scrolled downward until this list item is displayed as the last item in the list display area. Otherwise, the list is scrolled downward until the first item in the list is displayed as the first item in the list display area. It can be understood that this display manner ensures the number of the list items displayed in the list display area always being the maximum number of list items that can be displayed in the list display area.

On the other hand, as an option, in this step, when the second operation is that the mouse indicator controlled by the mouse device is placed on a certain list item, the list may not be scrolled downward until the mouse indicator keeps staying on this list item for a predetermined time period, in the case that the mouse indicator enters the list display area for the first time or enters the list display area again after leaving it. For example, in the case that the mouse indicator enters the list display area for the first time or enters the list display area again after leaving it, when the mouse indicator is placed on any list item of the plurality of list items in the second area of the list display area, the list item may flash, vibrate, change colors or the like for the predetermined time period, to prompt the user that the list is about to scroll. If the mouse indicator keeps staying on this list item during the flashing, vibrating, changing colors or the like, the list will be scrolled downward; and if the user, for example, moves the mouse indicator out of the list display area during the flashing, vibrating, changing colors or the like, the list will not be scrolled downward. In this manner, when the mouse indicator enters the list display area for the first time or enters the list display area again after leaving it, there is sufficient time for the user to view clearly whether there is an option of interest in the list to avoid any missing.

The list display control method according to the embodiment of the present invention has been described in detail hereinbefore with reference to the drawings. The further operations of this method will be explained below.

As described above, the first operation on the list items in the first area of the list display area is an operation triggering the scrolling up of the list, and it can be understood that the list cannot actually be scrolled up when the first operation is performed on the first list item in the first area of the list display area. In this case, optionally, the user can be prompted by the vibration, the flashing or the color change of the first list item or with text prompt that the list cannot be scrolled up. In addition, in one of the exemplary embodiments as described above, if the list item on which the first operation is performed by the mouse device stays before the basic item, anyone among said list item and the items staying before said list item is used as the first predetermined item. Actually, as an alternative way, the basic item can still be the first predetermined item in this case, but the list is not scrolled, and instead, the user is prompted by the vibration, the flashing or color change of the first predetermined item or with text prompt that the list cannot be scrolled up. Similarly, when the second operation is performed on the last list item in the second area of the list display area, the list cannot actually be scrolled down. In this case, the user can also be prompted by the vibration, the flashing or the color change of the last list item or with text prompt that the list cannot be scrolled down. In addition, in one of the exemplary embodiments as described above, if the list item on which the second operation is performed by the mouse device stays after the basic item, anyone among said list item and the items staying after said list item is used as the second predetermined item. Actually, as an alternative way, the basic item can still be the second predetermined item in this case, but the list is not scrolled, and instead, the user is prompted by the vibration, the flashing or the color change of the second predetermined item or with text prompt that the list cannot be scrolled down to the second predetermined item.

In addition, the list item of interest may still not be found by the user after the list is scrolled upward/downward once according to the manner described above, and thus the list needs to be further scrolled upward/downward. In this case, the list can be further scrolled by repeating the first and second operations on the list items in the first and second areas, respectively.

Optionally, when the first operation is that the mouse indicator controlled by the mouse device is placed on anyone of the list items, after the list is scrolled upward, in response to the mouse device performing the first operation on any list item of the plurality of list items displayed in the list display area in the first area of the list display area again after performing a predetermined trigger operation, the list continues to scroll up until said any list item is displayed as the first determined predetermined item in the list display area. It will be explained below by way of example.

Still taking FIGS. 6(a) and 6(b) as an example, it is assumed that the first predetermined item is the first item in the list display area, and the list has been scrolled upward by placing the mouse indicator on the fifth list item in the left half area as shown in FIG. 6(a) to make the fifth list item is positioned at the first item in the list display area (as shown in FIG. 6(b)). It can be understood that the mouse indicator will still be positioned on the fifth list item in the list display area, i.e., the ninth list item, if no additional operation is performed. That is to say, the first operation is being performed on the ninth list item by the mouse device at that time. In this example, the list does not continue to scroll upward at that time, and instead will continue to scroll upward only if the mouse indicator is placed on any of the list items (e.g., the ninth list item as described above) in the left half area again after a trigger operation such as moving, double-click of the left key, click of the right key or the like is performed by the mouse device. In this manner, the user may control whether to scroll up the list continuously by performing the predetermined trigger operation, thereby avoiding continuous and automatic scrolling up of the list which results in not enough time for the user to read the content of every list item.

Similarly, as an option, when the second operation is that the mouse indicator controlled by the mouse device is placed on anyone of the list items, after the list is scrolled downward, in response to the mouse device performing the second operation on any list item of the plurality of list items displayed in the list display area in the second area of the list display area again after performing a predetermined trigger operation. In this example, the user also may control whether to scroll down the list continuously by performing the predetermined trigger operation, thereby avoiding continuous and automatic scrolling down of the list.

In addition, as an option, when the user has found the list item of interest in the list items displayed in the list display area, he/she can choose this list item by any suitable operation such as moving the mouse device, double-clicking the left key, clicking the right key, clicking the scrolling wheel of the mouse device or the like on the list item, as long as such an operation can be distinguished from the first and second operations.

FIGS. 7(a)-7(f) illustrate an exemplary situation of the list display according to an embodiment of the present invention. For the ease of understanding, a description of an exemplary implementation for the list display control method according to this embodiment will be given below in combination with a non-limiting example with reference to FIGS. 7(*a*)-7(*f*).

It is assumed that at most ten list items can be displayed in the list display area, the first area is the left half area of the list display area, the second area is the right half area of the list display area, the first predetermined item is the first item in the list display area, the second predetermined item is the last item in the list display area, the first and second operations are both the operation of placing the mouse indicator on a certain list item, and the predetermined trigger operation is the slide operation of the mouse device. As shown in FIG. 7(*a*), the first to tenth list items are displayed in the list display area at first. Subsequently, the mouse indicator moves to the fifth list item in the left half area and stays for a predetermined time period, for example, 3 seconds (during which the fifth list item flashes to prompt the user that the list is about to scroll), as shown in FIG. 7(*b*). In response to this operation of the mouse device, the list is scrolled upward until the fifth list item is positioned at the first item in the list display area, as shown in FIG. 7(*c*). It can be seen, at that time the mouse indicator still stays in situ, that is, on the ninth list item in the left half area. It is assumed that the mouse device slides in any direction and goes back to the left half area and stays on the ninth list item. In response to this operation of the mouse device, the list is scrolled upward again until the ninth list item is positioned at the first item in the list display area, as shown in FIG. 7(*d*). It can be seen, at that time the mouse indicator still stays in situ, that is, on the thirteenth list item in the left half area. It is assumed that the mouse device moves to the right half area and stays on the twelfth list item, as shown in FIG. 7(*e*). In response to this operation of the mouse device, the list is scrolled downward until the twelfth list item is positioned at the last item in the list display area, as shown in FIG. 7(*f*).

The list display control method according to the embodiment of the present invention has been described hereinbefore. In this embodiment, the mouse device needs not to be moved drastically so as to scroll the list items up or down, which makes the operation of list display easy. In addition, a certain list item in the list can be scrolled to the predetermined position by performing operation on this list item, so that a precise scrolling can be implemented, thereby the user can read every list item carefully and avoid missing any list item.

Figure 8:
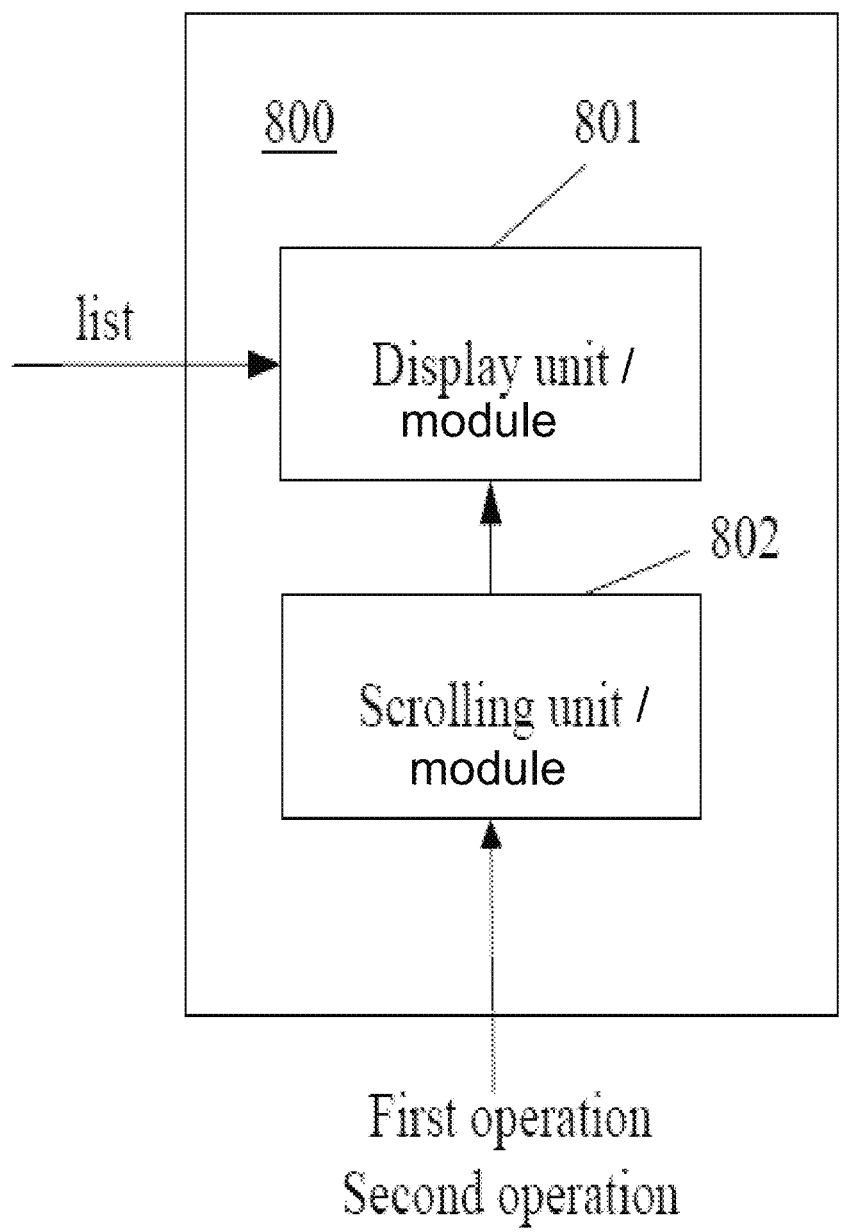
FIG. 8 shows a block diagram of a list display control device according to an embodiment of the present invention.

The block diagram of the list display control device according to an embodiment of the present invention will be described below with reference to FIG. 8.

The list display control device 800 according to the embodiment of the present invention can perform the list display control method described in the above embodiments. As shown in FIG. 8, the list display control device 800 includes a display unit 801 and a scrolling unit 802.

The display unit 801 displays a plurality of list items in the list display area. As described above, the list display area is an area used for displaying various list items in the list, and the size thereof can be set based on, for example, the size of the display screen. The display unit 801 is used for displaying plurality of list items in the set list display area.

The scrolling unit 802 performs at least one of the following based on operation of a pointer in the list display area: in response to a first operation of the pointer on any list item of the plurality of list items in a first area of the list display area, scrolling up the list until said any list item is displayed as a first predetermined item in the list display area; in response to a second operation of the pointer on any list item of the plurality of list items in a second area of the list display area which is different from the first area, scrolling down the list until said any list item is displayed as a second predetermined item in the list display area.

Firstly, the process performed by the scrolling unit 802 in response to the first operation of the pointer on any item of the plurality of list items in the first area of the list display area will be described.

As described above, the first area can be set depending on specific situations. For example, optionally, the first area can be a left/right half area, a left/right one third area, a left/right quarter area of the list display area or the like. In this embodiment, for the sake of easy explanation, the description is given in an example that the first area is the left half area of the list display area.

The pointer is a pointing device such as a mouse device, a finger of the user or the like. For the sake of easy explanation, the description will be given below in an example that the pointer is the mouse device.

The first operation can be various appropriate operations which are set in advance. For example, the first operation may be one or more click operations of the pointer, one or more slide operations of the pointer in any direction, an operation of placing a mouse indicator controlled by the mouse device on a certain list item when the pointer is the mouse device or an operation of placing a user's finger on a certain list item when the pointer is the finger.

When the mouse device performs a first operation in the first area of the list display area on any list item of the plurality of list items displayed in the list display area, the scrolling unit 802 causes the list to scroll upward until said list item is displayed as a first predetermined item in the list display area. It can be understood that in this manner of scrolling, the list item on which the first operation is performed by the mouse device is always scrolled to be positioned at a predetermined item in the list display area, thereby implementing a precise scrolling of the list.

The first predetermined item may be any appropriate list item set in advance. For example, as an option, the first predetermined item can be the first item in the list display area. As a more general manner, the first predetermined item may be set as following: setting any item in the list display area as a basic item, and if the list item on which the first operation is performed by the mouse device stays after or on the basic item, the basic item is used as the first predetermined item; if the list item on which the first operation is performed by the mouse device stays before the basic item, anyone among said list item and the items before said list item is used as the first predetermined item.

In addition, as an option, the first predetermined item may also be set as following: setting the list item n items before the one on which the first operation is performed by the mouse device as the basic item, and if the number m of the list items in the list display area staying before the one on which the first operation is performed by the mouse device is larger than n, the basic item is used as the predetermined item, otherwise anyone among the item on which the first operation is performed by the mouse device and those before this item is used as the predetermined item.

On the other hand, as an optional manner, the scrolling unit 802 can also control the scrolling of the list in the following manner. For the sake of easy explanation, the description is given here by taking an example that the first predetermined item is the first item in the list display area. In specific, in the case where the list items displayed in the list display area reach the maximum number of the list items which can be displayed in the list display area, if the number of the list items in the list staying after the list item on which the first operation is performed by the mouse device is not less than the number of the items which can be displayed at most in the list display area minus one, the scrolling unit 802 causes the list to scroll upward until this list item is positioned on the first item in the list display area. Otherwise, the scrolling unit 802 causes the list to scroll upward until the last item in the list is displayed as the last item in the list display area. According to this optional manner, the list items displayed in the list display area can always be ensured to be the maximum number of the list items that can be displayed in the list display area.

In addition, as an option, when the first operation is that the mouse indicator controlled by the mouse device is placed on a certain list item, the scrolling unit 802 can be set such that the list may not be scrolled upward until the mouse indicator keeps staying on this list item for a predetermined time period, in the case that the mouse indicator enters the list display area for the first time or enters the list display area again after leaving it. For example, in the case that the mouse indicator enters the list display area for the first time or enters the list display area again after leaving it, when the mouse indicator is placed on any list item of the plurality of list items in the first area of the list display area, the list item may flash, vibrate, change colors or the like for the predetermined time period, to prompt the user that the list is about to scroll. If the mouse indicator keeps staying on this list item during the flashing, vibrating, changing colors or the like, the scrolling unit 802 causes the list to be scrolled upward; and if the user, for example, moves the mouse indicator out of the list display area during the flashing, vibrating, changing colors or the like, the scrolling unit 802 does not scroll the list. In this manner, when the mouse indicator enters the list display area for the first time or enters the list display area again after leaving it, there is sufficient time for the user to view clearly whether there is an option of interest in the list to avoid any missing.

In addition, optionally, when the display unit 801 displays the plurality of list items in the list display area, in response to the first operation performed on the first list item in the first area of the list display area, the display unit 801 presents the vibration, the flashing or the color change, etc. of the first list item or presents text to prompt the user that the list cannot be scrolled up. In addition, in one of the exemplary embodiments as described above, if the list item on which the first operation is performed by the mouse device stays before the basic item, anyone among said list item and the items staying before said list item is used as the first predetermined item. Actually, as an alternative manner, the basic item can still be the first predetermined item in this case, but the list is not scrolled, and instead, the user is prompted by the vibration, the flashing or color change of the first predetermined item or with text prompt that the list cannot be scrolled up.

In addition, the list item of interest may still not be found by the user after the list scrolling unit 802 causes the list to be scrolled upward once according to the manner as described above, and thus the list needs to be further scrolled upward. In this case, the list scrolling unit 802 may cause the list to be further scrolled in response to repeating the first operation on the list items displayed in the list display area in the first area.

Optionally, when the first operation is that the mouse indicator controlled by the mouse device is placed on anyone of the list items, after the list is scrolled upward, in response to the mouse device performing the first operation on any list item of the plurality of list items displayed in the list display area in the first area of the list display area again after performing a predetermined trigger operation, the list scrolling unit 802 causes the list to continue to scroll up until said any list item is displayed as the first determined predetermined item in the list display area. In this manner, after the list is scrolled upward, the list scrolling unit 802 does not continue to scroll up the list until the mouse indicator is placed on anyone of the list items again after the trigger operation such as moving, double-click of the left key, click of the right key or the like is performed by the mouse device. In this way, the user may control whether to scroll up the list continuously by performing the predetermined trigger operation, thereby avoiding continuous and automatic scrolling up of the list which results in insufficient time for the user to read the content of every list item. Hereinafter, the process performed by the scrolling unit 802 in response to the second operation by the pointer on any item of the plurality of list items in the second area of the list display area will be described.

The specific operations of the scrolling unit 802 in this case are substantially similar to those in the case where the pointer performs the first operation on any item of the plurality of list items in the first area of the list display area, and for the sake of concision, the detailed description is given for only the difference there between.

Similar to the first area, the second area may also be set depending on specification situations. In specific, the second area is not overlapped with the first area, and optionally may be an area in the list display area which is symmetrical with the first area. For example, if the first area is the left/right half area, the left/right one third area, the left/right quarter area of the list display area or the like as described above, the second area may be the right/left half area, the right/left one third area, the right/left quarter area of the list display area or the like. In this embodiment, for the sake of easy explanation, the description is given in the example that the second area is the right half area of the list display area.

In addition, similar to the first operation, the second operation can also be various appropriate operations which are set in advance. For example, the second operation may be one or more click operations of the pointer, one or more slide operations of the pointer in any direction, an operation of placing a mouse indicator controlled by the mouse device on a certain list item when the pointer is the mouse device or an operation of placing a user's finger on a certain list item when the pointer is the finger. It can be understood that the second operation can be the same as or different from the first operation. Hereinafter, the explanation will be given by taking the example that the second operation is the same as the first operation.

When the mouse device performs the second operation in the second area of the list display area on any item of the plurality of list items displayed in the list display area, the scrolling unit 802 causes the list to be scrolled downward until said list item is displayed as a second predetermined item in the list display area. It can be understood that in this optional manner of scrolling, the list item on which the second operation is performed by the mouse device is always scrolled to be positioned at a predetermined item in the list display area, thereby implementing a precise scrolling of the list.

Similar to the first predetermined item, the second predetermined item can be any appropriate list item set in advance. For example, as an option, the second predetermined item can be the last item in the list display area. As a more general manner, the second predetermined item may be set as following: setting any item in the list display area as a basic item, and if the list item on which the second operation is performed by the mouse device stays before or on the basic item, the basic item is used as the second predetermined item; if the list item on which the second operation is performed by the mouse device stays after the basic item, anyone among said list item and the items staying after said list item is used as the second predetermined item.

In addition, as an option, the second predetermined item can also be set as following: setting the list item n items after the one on which the second operation is performed by the mouse device as the basic item, and if the number m of the list items in the list display area staying after the one on which the second operation is performed by the mouse device is larger than n, the basic item is used as the second predetermined item, otherwise anyone among the item on which the second operation is performed by the mouse device and those after this item is used as the second predetermined item.

On the other hand, as an optional manner, the scrolling unit 802 can also control the list to be scrolled in the following manner. For the sake of easy explanation, the description is given here by taking an example that the second predetermined item is the last item in the list display area. In specific, if the number of the list items staying before the list item on which the second operation is performed by the mouse device is not less than the number of the items which can be displayed at most in the list display area minus one, the scrolling unit 802 causes the list to be scrolled downward until this list item is displayed as the last item in the list display area. Otherwise, the scrolling unit 802 causes the list to be scrolled downward until the first item in the list is displayed as the first item in the list display area. According to this optional manner, the number of the list items displayed in the list display area can always be ensured to be the maximum number of the list items which can be displayed in the list display area.

In addition, as an option, when the second operation is that the mouse indicator controlled by the mouse device is placed on a certain list item, the scrolling unit 802 can be set such that the list may not be scrolled downward until the mouse indicator keeps staying on this list item for a predetermined time period, in the case that the mouse indicator enters the list display area for the first time or enters the list display area again after leaving it. For example, in the case where the mouse indicator enters the list display area for the first time or enters the list display area again after leaving it, when the mouse indicator is placed on any list item of the plurality of list items in the second area of the list display area, the list item may flash, vibrate, change colors or the like for the predetermined time period, to prompt the user that the list is about to scroll. If the mouse indicator keeps staying on this list item during the flashing, vibrating, changing colors or the like, the scrolling unit 802 causes the list to be scrolled downward; and if the user, for example, moves the mouse indicator out of the list display area during the flashing, vibrating, changing colors or the like, the scrolling unit 802 does not scroll the list. In this manner, when the mouse indicator enters the list display area for the first time or enters the list display area again after leaving it, there is sufficient time for the user to view clearly whether there is an option of interest in the list to avoid any missing.

In addition, optionally, when the display unit 801 displays the plurality of list items in the list display area, in response to the second operation performed on the last list item in the second area of the list display area, the display unit 801 presents the vibration, the flashing or the color change, etc. of the first list item or presents text to prompt the user that the list cannot be scrolled up. In addition, in one of the exemplary embodiments as described above, if the list item on which the second operation is performed by the mouse device stays after the basic item, anyone among said list item and the items staying after said list item is used as the second predetermined item. Actually, as an alternative manner, the basic item can still be the second predetermined item in this case, but the list is not scrolled, and instead, the user is prompted by the vibration, the flashing or color change of the second predetermined item or with text prompt that the list cannot be scrolled up. On the other hand, the list item of interest may still not be found by the user after the list scrolling unit 802 causes the list to be scrolled downward once according to the manner as described above, and thus the list needs to be further scrolled downward. In this case, the list scrolling unit 802 may cause the list to be further scrolled in response to repeating the second operation on the list items displayed in the list display area in the second area.

Optionally, when the second operation is that the mouse indicator controlled by the mouse device is placed on anyone of the list items, after the list is scrolled downward, in response to the mouse device performing the second operation on any list item of the plurality of list items displayed in the list display area in the second area of the list display area again after performing a predetermined trigger operation, the list scrolling unit 802 causes the list to continue to scroll down until said any list item is displayed as the second determined predetermined item in the list display area. In this manner, after the list is scrolled downward, the list scrolling unit 802 does not continue to scroll up the list until the mouse indicator is placed on anyone of the list items again after the trigger operation such as moving, double-click of the left key, click of the right key or the like is performed by the mouse device. In this way, the user may control whether to scroll down the list continuously by performing the predetermined trigger operation, thereby avoiding continuous and automatic scrolling down of the list which results in insufficient time for the user to read the content of every list item.

The list display control device according to the embodiment of the present invention has been described hereinbefore. In this embodiment, the mouse device needs not to be moved drastically so as to scroll the list items up or down, thereby making the operation of list display easy. In addition, a certain list item in the list can be scrolled to the predetermined position by performing operation on this list item so that a precise scrolling can be implemented, thereby the user can read every list item carefully so as to avoid missing any list item.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A list display control method, comprising:
    displaying a plurality of list items in a list display area, wherein the list display area includes a first area associated with a scroll up operation and a second area associated with a scroll down operation, and wherein the list display area displays the displayed plurality of list items exclusive of a scrollbar; and
    performing at least one of the following based on a clicking operation of a pointer in the list display area:

scrolling up, in response to a first clicking operation of the pointer on a list item of the plurality of list items in the first area of the list display area, the displayed plurality of list items until the list item is displayed as a first predetermined item in the list display area, wherein the list item is highlighted when the pointer is over the list item; and scrolling down, in response to a second clicking operation of the pointer on the list item of the plurality of list items in the second area of the list display area which is different from the first area, the displayed plurality of list items until the list item is displayed as a second predetermined item in the list display area, wherein the list item is highlighted when the pointer is over the list item.

2. The list display control method according to claim 1, wherein the first predetermined item is a first item and the second predetermined item is a last item.

3. The list display control method according to claim 1, wherein the pointer is a mouse device, the first and second operations are both any one of the following: a mouse indicator controlled by the mouse device being placed on any item of the plurality of list items, a click operation of the mouse device; and a slide operation of the mouse device.

4. The list display control method according to claim 1, wherein the first area is a left area of the list display area and the second area is a right area of the list display area; or the first area is the right area of the list display area and the second area is the left area of the list display area.

5. The list display control method according to claim 3, wherein the first operation is that the mouse indicator controlled by the mouse device is placed on any list item of the plurality of list items, and the method further comprises:
    after the list is scrolled up, scrolling up continuously, in response to the mouse device performing the first operation on any list item of the plurality of list items displayed in the list display area in the first area of the list display area again after performing a predetermined trigger operation, the list until any list item is displayed as the first predetermined item in the list display area.

6. The list display control method according to claim 3, wherein the second operation is that the mouse indicator controlled by the mouse device is placed on any list item of the plurality of list items and the method further comprises:
    after the list is scrolled down, scrolling down continuously, in response to the mouse device performing the second operation on any list item of plurality of list items displayed in the list display area in the second area of the list display area which is different from the first area again after performing a predetermined trigger operation, the list until any item is displayed as the second predetermined item in the list display area.

7. The list display control method according to claim 3, wherein the first and second operation are both that the mouse indicator controlled by the mouse device is placed on any list item of the plurality of list items, and
    wherein scrolling up, in response to the first operation of the pointer on the list item of the plurality of list items in the first area of the list display area, the displayed plurality of list items until the list item is displayed as the first predetermined item in the list display area further comprises:
    scrolling up the list until the list item is displayed as the first predetermined item in the list display area in response that the mouse indicator keeps staying on the list item for a predetermined time period, in a case where the mouse indicator enters the list display area for the first time or enters the list display area again after leaving the list display area;
    wherein scrolling down, in response to a second operation of the pointer on the list item of the plurality of list items in the second area of the list display area which is different from the first area, the displayed plurality of list items until the list item is displayed as the second predetermined item in the list display area further comprises:
    scrolling down the list until the list item is displayed as the second predetermined item in the list display area in response that the mouse indicator stays on the list item for the predetermined time period, in a case where the mouse indicator enters the list display area for the first time or enters the list display area again after leaving the list display area.

8. The list display control method according to claim 7, wherein a third operation is performed on any list item during predetermined time period to indicate that the list is about to scroll.

9. A list display control device, comprising:
    a hardware display module, for displaying a plurality of list items in a list display area, wherein the list display area includes a first area associated with a scroll up operation and a second area associated with a scroll down operation, and wherein the list display area displays the displayed plurality of list items exclusive of a scrollbar; and
    a hardware scrolling module, for performing at least one of the following based on a clicking operation of a pointer in the list display area:
    scrolling up, in response to a first clicking operation of the pointer on a list item of the plurality of list items in the first area of the list display area, the displayed plurality of list items until the list item is displayed as a first predetermined item in the list display area, wherein the list item is highlighted when the pointer is over the list item; and
    scrolling down, in response to a second clicking operation of the pointer on the list item of the plurality of list items in the second area of the list display area which is different from the first area, the displayed plurality of list items until the list item is displayed as a second predetermined item in the list display area, wherein the list item is highlighted when the pointer is over the list item.

10. The list display control device according to claim 9, wherein the first predetermined item is a first item and the second predetermined item is a last item.

11. The list display control device according to claim 9, wherein the pointer is a mouse device, the first and second operations are both any one of the following: a mouse indicator controlled by the mouse device being placed on any item of the plurality of list items, a click operation of the mouse device; and a slide operation of the mouse device.

12. The list display control device according to claim 9, wherein the first area is a left area of the list display area and the second area is a right area of the list display area; or the first area is the right area of the list display area and the second area is the left area of the list display area.

13. The list display control device according to claim 11, wherein the first operation is that the mouse indicator controlled by the mouse device is placed on any list item of the plurality of list items, and the hardware scrolling module further comprises:
    after the list is scrolled up, scrolling up continuously, in response to the mouse device performing the first operation on any list item of the plurality of list items displayed in the list display area in the first area of the list display area again after performing a predetermined trigger operation, the list until any list item is displayed as the first predetermined item in the list display area.

14. The list display control device according to claim 11, wherein the second operation is that the mouse indicator controlled by the mouse device is placed on any list item of the plurality of list items, and the hardware scrolling module further comprises:

after the list is scrolled down, scrolling down continuously, in response to the mouse device performing the second operation on any list item of plurality of list items displayed in the list display area in the second area of the list display area which is different from the first area again after performing a predetermined trigger operation, the list until any item is displayed as the second predetermined item in the list display area.

15. The list display control device according to claim 11, wherein the first and second operation are both that the mouse indicator controlled by the mouse device is placed on any list item of the plurality of list items, and the hardware scrolling module further comprises:

scrolling up the list until any list item is displayed as the first predetermined item in the list display area in response that the mouse indicator keeps staying on any list item in the first area of the list display area for a predetermined time period; and/or to scroll down the list until any list item is displayed as the second predetermined item in the list display area in response that the mouse indicator keeps staying on any list item in the second area of the list display area, in a case where the mouse indicator enters the list display area for the first time or enters the list display area again after leaving it.

16. The list display control device according to claim 15, wherein a third operation is performed on any list item during predetermined time period to indicate that the list is about to scroll.

17. A computer system for list display control, the computer system comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

displaying a plurality of list items in a list display area, wherein the list display area includes a first area associated with a scroll up operation and a second area associated with a scroll down operation, and wherein the list display area displays the displayed plurality of list items exclusive of a scrollbar; and performing at least one of the following based on a clicking operation of a pointer in the list display area:

scrolling up, in response to a first clicking operation of the pointer on a list item of the plurality of list items in the first area of the list display area, the displayed plurality of list items until the list item is displayed as a first predetermined item in the list display area, wherein the list item is highlighted when the pointer is over the list item; and scrolling down, in response to a second clicking operation of the pointer on the list item of the plurality of list items in the second area of the list display area which is different from the first area, the displayed plurality of list items until the list item is displayed as a second predetermined item in the list display area, wherein the list item is highlighted when the pointer is over the list item.

18. The computer system according to claim 17, wherein the first predetermined item is a first item and the second predetermined item is a last item.

19. The computer system according to claim 17, wherein the pointer is a mouse device, the first and second operations are both any one of the following: a mouse indicator controlled by the mouse device being placed on any item of the plurality of list items, a click operation of the mouse device; and a slide operation of the mouse device.

20. The computer system according to claim 17, wherein the first area is a left area of the list display area and the second area is a right area of the list display area; or the first area is the right area of the list display area and the second area is the left area of the list display area.

* * * * *